United States Patent

[11] 3,623,985

| [72] | Inventor | Yngve G. Hendrickson<br>El Cerrito, Calif. |
|---|---|---|
| [21] | Appl. No. | 626,704 |
| [22] | Filed | Mar. 29, 1967 |
| [45] | Patented | Nov. 30, 1971 |
| [73] | Assignee | Chevron Research Company<br>San Francisco, Calif. |

[54] POLYSUCCINIMIDE ASHLESS DETERGENTS AS LUBRICATING OIL ADDITIVES
4 Claims, No Drawings

[52] U.S. Cl. ........................................... 252/51.5 A,
252/46.7, 252/49.9, 260/249.6, 260/326.3
[51] Int. Cl. ........................................... C10m 1/32
[50] Field of Search .......................... 252/49.9,
46.7, 51.5 A; 260/326.3, 249.6

[56] References Cited
UNITED STATES PATENTS

| 3,184,411 | 5/1965 | Lowe ........................... | 252/46.7 |
| 3,184,412 | 5/1965 | Lowe et al. ................... | 252/46.7 |
| 3,185,643 | 5/1965 | Lowe et al. ................... | 252/32.7 E |
| 3,219,666 | 11/1965 | Norman et al. ................ | 252/51.5 A X |
| 3,373,112 | 3/1968 | Anderson et al. .............. | 252/51.5 A X |
| 3,502,677 | 3/1970 | Le Suer ........................ | 252/46.7 |

*Primary Examiner*—Daniel E. Wyman
*Assistant Examiner*—I. Vaughn
*Attorneys*—A. L. Snow, F. E. Johnston, John Stoner, Jr. and B. I. Rowland

ABSTRACT: Compositions having three alkenyl succinimides bonded through an amine nitrogen to a central nucleus such as a triazine or phosphorous acid derivative. The compositions find use as detergents and dispersants in lubricating oils.

3,623,985

POLYSUCCINIMIDE ASHLESS DETERGENTS AS LUBRICATING OIL ADDITIVES

BACKGROUND OF THE INVENTION

1. Field of the Invention

The modern lubricating oil contains detergents and dispersants to prevent the formation of deposits and the depositing of sludge in internal combustion engines. To be an acceptable detergent, not only must the additive have good detersive capability, but its decomposition products must not enhance the formation of deposits.

2. Description of the Prior Art

For a long time most detergents, particularly in diesel engines, contained inorganic salts which resulted in the deposition of ash. Recently, ashless detergents have been prepared by combining an alkylene polyamine with an alkenyl succinic anhydride to form alkenyl succinimides among minor amounts of other compositions. See U.S. Pat. Nos. 3,024,237; 3,202,678; and 3,275,554.

SUMMARY OF THE INVENTION

Pursuant to this invention, compositions having excellent detersive and detergent capability and being capable of retaining this capability for long periods of time are provided which are tris succinimides bonded, through a chain containing basic amino nitrogen, to a central nucleus, wherein the individual compounds have at least a total of three basic amino nitrogens and molecular weights in the range of 1,000 to 10,000. The succinimides will be alkenyl succinimides, wherein the R group will have at least about 20 carbon atoms, more usually at least about 30 carbon atoms and generally not more than 200 carbon atoms, usually not more than 100 carbon atoms.

As indicated, there will be at least three basic amino nitrogens and more usually from about three to fifteen basic amino nitrogens. The central nucleus will form a relatively hydrolytically stable bond to the nitrogen of the alkylene polyamine. Usually, the central nucleus will be based on a phosphorous containing derivative including thiophosphate or on a triazine derivative. The central nucleus will generally be of from about zero to 12 carbon atoms, more usually of from about zero to three carbon atoms, and will have as its heteroatoms nitrogen, chalcogen (oxygen or sulfur) and phosphorous; that is, the elements of Group V to VI of the Periodic Chart of atomic numbers in the range of seven to 16.

DESCRIPTION OF THE PREFERRED EMBODIMENTS

For the most part, the compositions of this invention will have the following formula:

$$X([(NY)_xN\begin{smallmatrix}C-CH_2\\||\\O\end{smallmatrix}\begin{smallmatrix}\\|\\C-CHR\\||\\O\end{smallmatrix}]H_x)_3$$

wherein X is a central nucleus generally of from zero to 12 carbon atoms, zero to six nitrogen atoms (usually zero to three nitrogen atoms), zero to one phosphorous atoms, any other atom being chalcogen of atomic number eight to 16, i.e., oxygen and sulfur;

the trivalent radical will usually be based on such functionalities as phosphoric $\begin{pmatrix}O\\||\\P\equiv\end{pmatrix}$, phosphorothioic $\begin{pmatrix}S\\||\\P\equiv\end{pmatrix}$, phosphorous tricarbamoyl (P[HNCO—]$_3$), phosphoric tricarbamoyl $\begin{pmatrix}O\\||\\P[HNCO—]_3\end{pmatrix}$, phosphorothioic tricarbamoyl $\begin{pmatrix}S\\||\\P[HNCO—]_3\end{pmatrix}$ and triazine 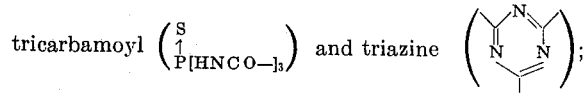;

Y is alkylene of from two to six carbon atoms, more usually of from two to three carbon atoms, there being at least two carbon atoms between the nitrogen atoms, R is alkyl or alkenyl of from 20 to 200 carbon atoms, more usually of from 30 to 100 carbon atoms and x is an integer of from 2 to 7, more usually of from 2 to 4.

While the compositions of this invention, for the most part, have the above formula, invariably there will be minor amounts of other materials present. That is, the tris derivative may contain small amounts of mono- or di- derivatives, as well as other products formed by side reactions. However, the major product will be a composition having the above formula. Moreover, because of the plurality of nitrogens, the central nucleus may be attached to any of the basic nitrogens of the alkylene amine. Therefore, the product will be a mixture of isomers, wherein the central nucleus may be bonded to different nitrogens of the alkylene polyamines.

The compositions having a phosphoric acid derivative as a central nucleus will generally have the following formula:

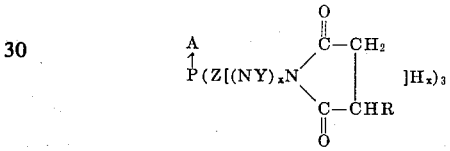

wherein A is chalcogen of atomic number of from eight to 16, Z is a bond or NHCO, Y is alkylene of from two to six carbon atoms, more usually of from two to three carbon atoms, R is alkyl or alkenyl of from 20 to 200 carbon atoms, more usually of from 30 to 100 carbon atoms, and x is an integer of from 2 to 7, more usually of from 2 to 4.

The parent phosphoric acid from which the radicals are derived are illustrated by phosphoric acid, phosphorothioic acid, phosphoric tricarbamic acid, phosphorothioic tricarbamic acid, phosphorous tricarbamic acid.

When the central nucleus is a triazine, the composition will have the following formula:

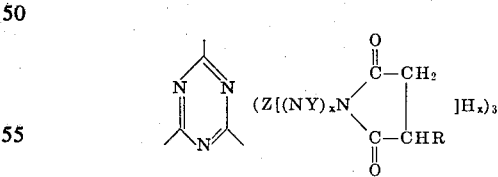

wherein Z is a bond of NHCO, Y is alkylene of from two to six carbon atoms, more usually of from two to three carbon atoms, R is alkyl or alkenyl of from 20 to 200 carbon atoms, more usually of from 30 to 100 carbon atoms, and x is an integer of from 2 to 7, more usually of from 2 to 4.

The triazine nucleus may be alkylated or unsubstituted, the alkyl groups usually being of from one to two carbon atoms, e.g., methyl or ethyl.

The compositions of this invention are generally prepared by first preparing the alkenyl succinimide of an alkylene polyamine, followed by reacting the resulting succinimide with a reactive species of the central nucleus. The preparation and reactants for the alkenyl succinimide will be considered first.

The alkylene polyamines will generally have the following formula:

$$H_2N(YNH)_xH$$

wherein Y is alkylene of from two to six carbon atoms, the two valences being on different carbon atoms and $x$ is an integer of from 2 to 7, more usually of from 2 to 4.

As already indicated, the alkylene polyamines will have alkylene groups of from two to six carbon atoms, more usually of from two to three carbon atoms. Illustrative alkylene groups are ethylene, propylene, butylene, 1-ethyl ethylene, hexamethylene, etc. Usually, the nitrogen atoms are separated by only two to three carbon atoms. The number of nitrogen atoms in the alkylene polyamine will generally be of from three to six, more usually of from three to five. Included in the alkylene polyamine are piperazine derivatives which are functional equivalents. The piperazines are frequently side products in the preparation of polyalkylene polyamines. An exemplary piperazine derivative is N-(2-aminoethyl)piperazine. Illustrative alkylene polyamines or polyalkylene polyamines are diethylene triamine, dipropylene triamine, triethylene tetramine, tetraethylene pentamine, pentamethylene hexamine, dipropylene triamine, etc.

The alkenyl succinic anhydride which is reacted with the alkylene polyamine to form the succinimide will generally have the following formula:

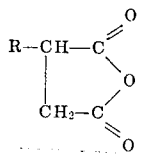

wherein R is an aliphatic hydrocarbon radical, saturated or having aliphatic unsaturation (usually only one site), straight chain or preferably branched chain, having from about 20 to 200 carbon atoms, preferably from about 30 to 100 carbon atoms. (While R has been referred to as alkenyl, it is intended to include both alkyl and alkenyl. Ordinarily, a polyolefin will be used in the preparation of the substituted succinic anhydride by reacting the olefin with maleic anhydride to form an alkenyl succinic anhydride. However, the aliphatic unsaturation may be reduced with hydrogen to form the alkyl substituent or the substituted succinic anhydride prepared in a different way. While the ease of preparation of the alkenyl succinic anhydride makes that compound the preferred species, the saturated analog will be equally operable and is not to be excluded by referring to the substituent as an alkenyl group. This terminology has found use in the art.)

The aliphatic hydrocarbon groups which R represents are most readily obtained by the polymerization of low molecular weight olefins, e.g., two to six carbon atoms. Illustrative olefins include ethylene, propylene, isobutylene, butene-1, 4-methyl-pentene-1, etc. The preferred monomers are propylene and isobutylene, providing branched chain aliphatic groups having 1 carbon atom branch from one to two carbon atoms along the chain. Naturally occurring aliphatic hydrocarbons of the desired molecular weight may also be used as substituents, e.g., mineral oil.

The preparation of the alkenyl succinic anhydride has been repeatedly published in numerous U.S. Pat. Nos. e.g., 3,018,250 and 3,024,195.

The preparation of the succinimide has also been published in numerous U.S. Pat. Nos. e.g., 3,172,892, 3,219,666 and 3,202,678. The succinimide is formed by bringing together the alkylene polyamine and the alkenyl succinic anhydride either neat or in a suitable solvent at elevated temperatures and removing the water of reaction.

The mole ratio of succinic anhydride to alkylene polyamine will generally be in the range of 1:0.5–5, more usually 1:1–2. The reaction temperature will generally range from about 85° to 325° C., more usually 125° to 300° C. Preferably, the mixture will be heated initially at a temperature in the lower portion of the range followed by heating at a temperature in the upper portion of the range.

The total time for the reaction will be in the range of 0.5 to 48 hours, usually 1 to 8 hours. Various inert solvents, or combinations of inert solvents may be used, such as hydrocarbon solvents, both paraffinic and aromatic, ethers and polyethers, inert halohydrocarbons, etc. Preferably a hydrocarbon oil of lubricating viscosity will be used. The reactants will usually be at a concentration of from about 5 to 75 weight percent.

The pressure will be atmospheric, but preferably subatmospheric toward the end of the reaction to remove volatile materials, e.g., water.

The alkenyl succinimides which are used as reactants will have the following formula:

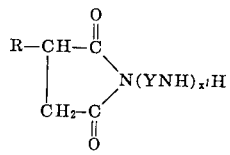

wherein R is alkyl or alkenyl of from 20 200 carbon atoms, more usually of from 30 to 100 carbon atoms, Y is alkylene of from two to six carbon atoms, more usually of from two to three carbon atoms, and $x^1$ is an integer of from 2 to 7, more usually of from 2 to 4.

Depending on the particular derivative of the alkylene polyamine succinimides, the reaction conditions will vary. When the reaction is to form the triazine derivative using cyanuric chloride, the alkylene polyamine succinimide will be combined with a cyanuric chloride in a suitable solvent and the mixture heated at temperatures in the range of 125° to 225° C. for a time sufficient to drive the reaction to completion, generally from about 0.5 to 8 hours. Usually, approximately stoichiometric amounts of the materials are used. Suitable solvents include dioxane, ethylene glycol dimethyl ether, diethylene glycol dimethyl ether, etc. That is, aliphatic polyethers of from two to six ethereal oxygen atoms. The concentration of the reactants will generally be for about 10 to 80 weight percent of the reaction mixture.

In the reaction with phosphoryl isocyanate, the alkenyl succinimide and the phosphoryl isocyanate are combined in a suitable solvent at elevated temperatures in approximately stoichiometric amount and the product isolated. The temperature of the reaction will generally be from about 75° C. to about 150° C., more usually from about 75° to 130° C. The time will be from about 0.5 to 8 hours. Suitable solvents and concentrations include those indicated above.

In the reaction with phosphorous oxytrichloride or phosphorothionic trichloride, the appropriate phosphorous trichloride derivative and alkenyl succinimide are combined, in the presence of a tertiary amine of from three to 12 carbon atoms to react with the hydrochloride formed, and dissolved in a suitable hydrocarbon solvent. The total concentration of the reactants will usually be from about 5 to 60 weight percent. Elevated temperatures are used, generally in the range of about 50° to 100° C. After sufficient time to drive the reaction to completion, generally from about 1 to 24 hours, the product is isolated.

In the preparation of the various derivatives, using different trifunctional reactants, the usual procedure for preparing a nitrogen derivative of the central nucleus will be used. The only differences from the normal procedure, and these will generally be minor, are the considerations necessary for using a high molecular weight primarily hydrocarbon compound and the plurality of amine nitrogens which are present. Therefore, the reactions will not ordinarily be carried out neat, nor will they be carried out at high concentrations. In this manner, polymerization or other side reactions will generally be minimized.

The following examples are offered by way of illustration and not by way of limitation.

Exemplary Preparation of Polyisobutenyl Succinimides

A. Into a reaction flask was introduced 860 g. (0.35 mole) of polyisobutenyl succinic anhydride (approximately 760 average mol. wt.) as a 40 weight percent solution in oil, and 360 g. (3.50 moles) of a composition having the average composition of diethylene triamine, the mixture blanketed with nitrogen and the temperature slowly raised over a period of 1.5 hours to 310° F. and then maintained at that temperature for 2 hours. At the end of this time, the reaction mixture was allowed to cool to 200° F. and a vacuum applied, slowly lowering the pressure to 4–5 mm. Hg and raising the temperature to 350° F. The residue weighted 863 g.

The above product was then diluted with 861 ml. of mixed hexanes and warmed to obtain a homogeneous solution. To the solution was added 574 ml. of 95 percent alcohol and the mixture heated with stirring to a fast reflux. The heating was stopped, 270 ml. of water added and the entire mixture transferred to a separatory funnel and allowed to separate into two layers, the upper layer isolated and volatile material stripped off by slowly reducing the pressure to 4–5 mm. Hg and raising the temperature to a final temperature of 149° C. The residue weighed 853 g. Analysis: % N, 1.45, 1.46; % basic N, 0.58, 0.59. An infrared spectrum indicated the product as the polyisobutenyl succinimide of alkylene polyamines having the average composition diethylene triamine.

B. Following a procedure similar to example A, 360 g. (2.46 moles) of a composition having the average composition of triethylene tetramine and 860 g. (0.35 mole) as a 40 weight percent solution in oil of polyisobutenyl succinic anhydride (approximately 760 average mol wt.) were combined and the mixture heated to 310° F. over a 1.5 hour period and held at that temperature for about 2 hours while maintaining a nitrogen atmosphere. At the end of this time, the reaction mixture was allowed to cool to 200° F. and then the pressure slowly reduced while the temperature was slowly raised providing an ultimate pressure of 4–5 mm. Hg and a temperature of 350° F. The residue weighed 893 g.

The residue was dissolved in 885 ml. of mixed hexanes, followed by the addition of 590 ml. of 95 percent ethyl alcohol. The mixture was then heated to a rapid reflux with stirring, followed by the addition of 295 ml. of water. After stirring the mixture for awhile, the mixture was transferred to a separatory funnel, the mixture allowed to separate into two layers, and the lower aqueous layer drawn off. The volatiles were then removed by heating the mixture in vacuo, realizing a final temperature of 149° C. and a final pressure of 4–5 mm. Hg. The residue weighed 857.5 g. Analysis % N, 2.59, 2.59; % basic N, 1.53, 1.55. An infrared spectrum indicated the product was the polyisobutenyl succinimide of alkylene polyamine having the average composition triethylene tetramine.

EXAMPLE I

Into a reaction flask was introduced 534 g. (0.159 mole) of polyisobutenyl succinimide of diethylene triamine (average composition) (prepared as described above) (polyisobutenyl succinic group of approximately 760 molecular weight) as an oil solution and 267 ml. of 1,4-dioxane. The mixture was stirred and 12 g. (0.065 mole) of cyanuric chloride in 80 ml. of 1,4-dioxane was added, the reaction mixture blanketed with nitrogen and then heated to reflux. After one hour of refluxing, the temperature was slowly raised to 175° C., distilling off any volatile material. The temperature was then allowed to drop to 100° C. and the pressure slowly reduced while the temperature was slowly raised, finally achieving a pressure of 4–6 mm. Hg and a temperature of 175° C. The residue weighed 544 g.

To the above product was added 544 ml. of mixed hexanes and the mixture stirred, followed by the addition of 362 ml. of 95 percent alcohol. The mixture was then heated to a fast reflux for a short while, followed by the addition of 180 ml. of 10 percent aqueous sodium carbonate. Particulate matter settled to the bottom and the liquid phase was transferred to a separatory funnel, washing the particulate matter with mixed hexanes and adding the mixed hexanes to the original hexane solution. After some difficulty, the organic layer was separated from the aqueous layer and the extraction of the organic layer repeated with 95 percent alcohol and 10 percent aqueous sodium carbonate as described above. Again after some difficulty, two layers were achieved, the organic layer isolated and the volatile material removed by distillation in vacuo, slowly reducing the pressure to 4–5 mm. Hg and raising the temperature of 149° C. The residue weighed 523 g. Analysis: % N, 1.97, 1.97; % basic N, 0.40, 0.42; percent Chlorine, 0.5. An infrared spectrum was consistent with the anticipated product.

The above product was further purified as follows: 509 g. was dissolved in 510 ml. of mixed hexanes and 340 ml. of 95 percent alcohol added and the mixture heated to a fast reflux. The heating was stopped and 170 ml. of 10 percent aqueous sodium carbonate added, while stirring for a short time. After some difficulty, two layers were obtained, an organic and an aqueous layer, the aqueous layer discarded and the organic layer freed of volatile material by distilling in vacuo. The pressure was slowly reduced to 4–5 mm. Hg and the temperature raised to 149° C. The residue weighed 496 g. Analysis: % N, 2.00, 2.00; % basic N, 0.39, 0.40; percent Chlorine, 0.12. An infrared spectrum was taken of the product which had the expected peak absorption for the desired product.

EXAMPLE II

Following the procedure of example I, 300 g. (0.11 mole) of polyisobutenyl succinimide of diethylene triamine (average composition) (polyisobutenyl succinic group of approximately 760 average mol wt., % N, 1.52, 1.53; % basic N, 0.63, 0.65) as an oil solution was mixed with 150 ml. of 1,4-dioxane. To this mixture was added 6.74 g. (0.0365 mole) of cyanuric chloride in 45 ml. of 1,4-dioxane.

After following the procedure of example I and extracting the material twice with alcohol and aqueous sodium carbonate, and distilling volatile materials, the residue weighed 289.1 g. Analysis; % N, 1.96, 1.96; % basic N, 0.39, 0.39; percent Chlorine, 0.06. An infrared spectrum was taken of the product which had the expected peak absorptions for the desired product.

EXAMPLE III

Following the procedure of example I, 564 g. (0.21 mole) of polyisobutenyl succinimide of diethylene triamine (average composition) (polyisobutenyl succinic group of approximately 760 mol wt.; % N, 1.45, 1:46; % basic N, 0.58, 0.59) and 282 % ml. of 1,4-dioxane were mixed and 12.0 g. (0.065 mole) of cyanuric chloride and 80 ml. of 1,4-dioxane added. After following the reaction and extraction procedures of Example I, a residue weighing 557 g. was obtained. Analysis; % N. 1.89, 1.93; % basic N, 0.34, 0.35; percent Chlorine, 0.08. An infrared spectrum was taken of the product which had the expected peak absorptions for the desired product.

EXAMPLE IV

Into a reaction flask was introduced 800 g. of a 40 weight percent solution of polyisobutenyl succinimide of tetraethylene pentamine (approximately 1400 average mol wt., % N, 2.1, approximately 0.24 mole) and 400 ml. of 1,4-dioxane, the mixture stirred and 15.6 g. (0.0845 mole) of cyanuric chloride in 100 ml. of 1,4-dioxane added. A nitrogen atmosphere was introduced over the reaction mixture and the mixture heated to reflux. After refluxing for about 1 hour, distillation of the volatile materials was begun by raising the temperature to 175° C. at atmospheric pressure. The temperature was maintained for 1 hour after which time the pressure was slowly reduced to 4–5 mm. Hg while maintaining the temperature. The residue weighed 813 g.

The above product (400 g.) was mixed with 400 ml. of mixed hexanes and 280 ml. of 95 percent ethyl alcohol added. After refluxing the mixture for one-half hour, 120 ml. of 10 percent aqueous sodium carbonate was added and refluxing maintained for 15 minutes. The mixture was allowed to cool and transferred to a separatory funnel for separation. After standing for 6 days without satisfactory separation, the mixture was centrifuged resulting in three layers. The organic layer was isolated, the aqueous layer discarded and the emulsive layer diluted with mixed hexanes and centrifuged a second time. The organic layer was separated and added to the prior organic layer Volatile material was then removed *in vacuo* by slowly reducing the pressure to 4–5 mm. Hg and raising the temperature to a final temperature of 149° C. The residue weighed 373.5 g.

A second sample of the original reaction product weighing 384.5 g. was mixed with 400 ml. of mixed hexanes and 260 ml. of 95 percent alcohol. After heating the mixture at reflux for one-half hour, 130 ml. of 10 percent aqueous sodium carbonate was added and the mixture further stirred under reflux for 15 minutes. After some difficulty, 2 layers were obtained upon standing, the upper organic layer separated, and the emulsive layer centrifuged after being diluted with an equal volume of mixed hexanes. After heating, a lower aqueous layer separated, which was discarded. The organic layers were combined and volatile materials removed by slowly raising the temperature to 149° C. and lowering the pressure to 4–5 mm. Hg. The residue weighed 361.5 g. Analysis: % N, 2.38, 2.40.

The above products were combined and the extraction repeated as before. After removal of the volatile materials, a residue of 698 g. was obtained. Analysis; % N, 2.34, 2.37; % basic N, 0.73, 0.74; % Cl, less than 0.1.

EXAMPLE V

Into a reaction flask was introduced 735 g. of a 40 weight percent oil solution of polyisobutenyl succinimide of tetraethylene pentamine (avg. composition) (about 1,400 average mol wt., % N, 2.38), 31.0 g. of triethylamine and 150 ml. of mixed hexanes. 17.0 g. of phosphorothionic trichloride ($PSCl_3$) in 25 ml. of benzene was slowly added with stirring. When the addition was completed, the reaction mixture was heated at reflux for 16 hours. After cooling, 200 ml. of mixed hexanes were added and the solution filtered. Volatile material was removed by heating the solution to 200° C. while reducing the pressure to 5 mm. Hg. The residue weighed 719 g. Analysis: % S, 0.3, 0.4; % P, 0.4, 0.5.

EXAMPLE VI

Into a 0.5 liter 3-neck flask equipped with stirrer and condenser were charged 190 g. of a 50 weight percent solution in oil of polyisobutenyl succinimide of diethylene triamine (0.08 mole; polyisobutenyl of about 640 av. mol. wt.; % N, 1.77, 1.78; % basic N, 0.67, 0.68;) and 50 ml. of 1,4-dioxane. While blanketing with nitrogen, the mixture was stirred with mild heating. To the solution was then added a solution of 4.70 g. (0.0267 mole) of phosphoryl isocyanate in 50 ml. of 1,4-dioxane. The mixture was refluxed (102°–104° C.) with stirring under nitrogen for about 2 hours. At the end of the 2 hours, the condenser was turned down and the dioxane distilled over, slowly reducing the pressure and raising the temperature. The final pressure was 6–9 mm. and the final temperature about 177° C., these conditions being held for about one-half hour. The residue weighed 193.6 g.

A 191.4 g. fraction of the above residue was transferred to a 2 liter beaker, rinsing the reaction flask twice with 100 ml. portions of mixed hexanes and adding the washings to the beaker, followed by the addition of 250 ml. of mixed hexanes. The mixture was stirred with mild heating until homogeneous. 300 ml. of 95 percent alcohol was then added, the solution heated with stirring to 125° F. and 150 ml. of water added. The temperature was raised to 135° F. and the solution transferred to a 2 liter separatory funnel, separating into 2 layers.

The lower layer was drawn off. The organic layer was returned to the 2 liter beaker and the extraction procedure described above repeated. The organic layer was stripped of volatile materials at about 200 mm. Hg and up to 130° C. by transferring the solution portionwise to the reaction flask equipped as previously described except for a turned down condenser. Finally, the pressure was reduced to 6–8 mm. Hg and the temperature raised to 149° C. and the conditions maintained for one-half hour.

The reaction product weighed 188.2 g. Analysis; % N, 2.24, 2.23; % P, 0.44. An infrared spectrum had the appropriate peaks for the anticipated phosphoryl urea product.

The compositions of this invention find use as detergents in lubricating oil and are found to be effective under a wide variety of conditions: not only under the hot conditions of the diesel engine, but the much more variable temperature conditions of the automobile engine.

The compositions of this invention may be formulated with various lubricating fluids (hereinafter referred to as oils) which are either derived from natural or synthetic sources. Oils generally have viscosities of from about 35 to 50,000 Saybolt Universal Seconds (SUS) at 100° F. Among natural hydrocarbonaceous oils are paraffin base, naphthenic base, asphaltic base and mixed base oils. Illustrative of synthetic oils are: hydrocarbon oils such as polymers of various olefins, generally of from two to eight carbon atoms, and alkylated aromatic hydrocarbons; and nonhydrocarbon oils, such as polyalkylene oxides, aromatic ethers, carboxylate esters, phosphate esters, and silicon esters. The preferred media are the hydrocarbonaceous media, both natural and synthetic.

The above oils may be used individually or together whenever miscible or made so by the use of mutual solvents.

When the detergents of this invention are compounded with lubricating oils for use in an engine, the detergents will be present in at least about 0.1 weight percent and usually not more than 20 weight percent, more usually in the range of about 1 to 10 weight percent. The compounds can be prepared as concentrates due to their excellent compatibility with oils. As concentrates, the compounds of this invention will generally range from about 10 to 70 weight percent, more usually from about 20 to 50 weight percent of the total composition.

A preferred aspect in using the compounds of this invention in lubricating oils is to include in the oil from about 1 to 50 mm./kg. of a dihydrocarbyl phosphorodithioate, wherein the hydrocarbyl groups are from about four to 36 carbon atoms. Usually, the hydrocarbyl groups will be alkyl or alkaryl groups. The remaining valence of the phosphorodithioate will usually be satisfied by zinc, but polyalkyleneoxy or a third hydrocarbyl group may also be used. (Hydrocarbyl is an organic radical composed solely of carbon and hydrogen which may be aliphatic, alicyclic, or aromatic.)

Other additives may also be included in the oil such as pour point depressants, oiliness agents, antioxidants, rust inhibitors, etc. Usually the total amount of these additives will range from about 0.1 to 10 weight percent, more usually from about 0.5 to 5 weight percent. The individual additives may vary from about 0.01 to 5 weight percent of the composition.

In order to demonstrate the excellent effectiveness of the compounds of this invention as detergents and dispersants in lubricating oils, a number of the compounds were tested in a 1–G Caterpillar test (MIL–L–45199 conditions). The oil used was a Mid-Continent SAE 30 oil and 12 mm./kg. of zinc di(alkylphenyl) phosphorodithioate (the alkyl groups were polypropylene of about 12 to 15 carbon atoms) was included. The following table indicates the particular derivative used, the amount used, the time for which the run was carried out and the results. Also included for comparison are the results for the base oil containing only the phosphorodithioate. The rating of groove deposits is based on a range of 0 to 100, 100 being completely filled grooves. The rating for land deposits is based on a range of 0 to 800, 800 being completely black. The rating for underhead deposits is based on a range of 0 to 10, 10 being completely clean.

TABLE I

| Ex. | Composition Wt. percent | Hours | Groove deposits | Land deposits | Underhead deposits |
|---|---|---|---|---|---|
| (¹) | 8.93 | 60 | 13-1-0-0 | 30-10-0 | 7.0 |
|  |  | 120 | 43-6-0-0 | 175-20-5 | 5.1 |
| IV | 3.99 | 60 | 22-3-0-0 | 230-5-0 | 9.1 |
|  |  | 120 | 53-13-0-0 | 375-20-10 | 7.0 |
| (²) |  | 60 | 93-15-5-3 | 500-800-330 |  |

¹ Composite of the following compositions; amount added to the oil:
  Ex. I—4.65 wt. percent
  Ex. II—2.5 wt. percent
  Ex. III—1.78 wt. percent.
² Contains 12 mM./kg. of indicated phosphorodithioate.

To demonstrate the effectiveness of the compositions of this invention in an automobile internal combustion engine, a modified FL-2 test procedure, as described in June 21, 1948 report of the Coordinating Research Council was employed. A standard procedure requires the maintenance of a jacket temperature of 95° F. and a crankcase oil temperature of 155° F. at 2,500 r.p.m. and 45 brake horsepower for a period of 40 hours (closely simulating the relatively "cold" engine conditions which are normally experienced in city driving). At the end of each test, the engine is dismantled and the amount of sludge (rating of 0 to 50, no sludge being 50) and varnish (rated in the same way) is determined. Also determined is ring and screen clogging reported as percent clogging.

The above test was modified by increasing the time and periodically raising the oil sump temperature from 165° F. to 205° F. and the water jacket temperature from 95° F. to 170° F.

Using a Mid-Continent SAE 30 base stock, the candidate detergent was employed at 1.14 weight percent concentration; also included in the oil was 10 mm./kg. of zinc 0,0-di(alkyl)dithiophosphate (alkyl of from four to six carbon atoms) and 2 mm./kg. of zinc O,O-di(alkylphenyl)dithiophosphate (alkyl is polypropylene of from 12 to 15 carbon atoms). The following table indicates the results obtained. For comparison, without the additive, the engine is incapable of running after about 12 hours.

TABLE II

| Example | Wt. percent | Hours | Total Varnish | Total sludge | Percent clogging Rings | Screens |
|---|---|---|---|---|---|---|
| V | 1.14 | 80 | 23 | 30 | 73 | 10 |

It is evident from the above results that the compositions of this invention are excellent detergents and dispersants in lubricating oils under the varying conditions of different types of internal combustion engines. The compositions of this invention are stable for very long periods of time under the extremely hot conditions of the diesel engine. By contrast, they are able to maintain sludge dispersed in oil under the relatively "cold" and varying conditions of the internal combustion engine. The detergents of this invention greatly enhance lubricant protection over the presently available detergents which provide excellent detergency. The useful life of the lubricating oil is thus greatly extended.

Furthermore, the compositions based on derivatives of phosphorothionic acid find use as oxidation inhibitors. The composition of example V was tested in the "Oxidator B" test as follows: Using a 73 V.I. SAE 40 base oil, a composition was prepared by adding to 25 g. of the oil 0.2 cc. of a solution having 3,160 p.p.m. of copper, 2,670 p.p.m. of iron, 160 p.p.m. of manganese, 36,700 p.p.m. of lead and 1,631 p.p.m. of tin, all as their naphthenates. This distribution of metals is expected to be found in used crankcase oils after an L-4 Chevrolet engine test. The oil sample to be tested is maintained at 340° F. and the time required to absorb 250 ml. of oxygen is observed. The results are reported as if 100 g. of an oil sample was used and 1,000 ml. of oxygen absorbed. Without any additive, the oxygen was absorbed in 0.7 hours. With a sample containing 10 weight percent of the composition of example V, the time required was 7.2 hours.

It is evident from the above result that by varying the central nucleus, advantages other than detergency can be achieved, e.g., oxidation inhibition.

As will be evident to those skilled in the art, various modifications on this invention can be made or followed, in the light of the foregoing disclosure and discussion, without departing from the spirit or scope of the disclosure or from the scope of the following claims.

I claim:
1. A composition of the formula:

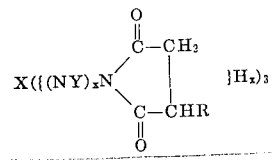

wherein X is a trivalent triazinyl radical, Y is alkylene of from two to six carbon atoms, R is alkyl or alkenyl of from 20 to 200 carbon atoms and $x$ is an integer of from 2 to 7.

2. A composition according to claim 1, wherein said R is an alkenyl group of from 30 to 100 carbon atoms.

3. A composition according to claim 1, wherein $x$ is 2.

4. A lubricating oil composition containing in an amount to provide detergency and dispersancy, a composition according to claim 1.

* * * * *